United States Patent [19]

Keske et al.

[11] Patent Number: 5,194,175
[45] Date of Patent: Mar. 16, 1993

[54] RIGID FOAMS, METHODS FOR PREPARATION THEREOF AND COMPOSITIONS USEFUL IN METHODS AND PREPARATIONS THEREOF

[75] Inventors: David G. Keske, Glencoe; Mark S. Schulte, St. Charles, both of Mo.

[73] Assignee: Foam Supplies, Inc., St. Louis, Mo.

[21] Appl. No.: 684,008

[22] Filed: Apr. 11, 1991

Related U.S. Application Data

[62] Division of Ser. No. 384,643, Jul. 24, 1989, Pat. No. 5,032,623.

[51] Int. Cl.$^5$ .......................... C08J 9/06; C08G 18/14
[52] U.S. Cl. .......................... 252/182.25; 252/182.26; 252/182.27; 521/131; 521/174; 521/175; 521/167
[58] Field of Search .................. 252/182.25, 182.26, 252/182.27; 521/131, 167, 174, 175

[56] References Cited

U.S. PATENT DOCUMENTS 4,530,777  7/1985  Kennedy ..................... 252/182.2

*Primary Examiner*—Morton Foelak
*Attorney, Agent, or Firm*—Rogers, Howell & Haferkamp

[57] ABSTRACT

A method for preparation of rigid foam disclosed. The method comprises mixing at least two components to form a reaction mixture. The reaction mixture comprises isocyanate, up to about 20% by weight $CHClF_2$, up to about 2% by weight of water, and a combination of polyols having an average OH number of from about 300 to about 500 and comprising polyalkoxylated glycerin having an OH number of from about 200 to about 300 and in which the alkoxy groups each have from two to about three carbon atoms. Related methods and compositions are also disclosed.

4 Claims, No Drawings

RIGID FOAMS, METHODS FOR PREPARATION THEREOF AND COMPOSITIONS USEFUL IN METHODS AND PREPARATIONS THEREOF

This is a divisional of copending application Ser. No. 07/384,643 filed on Jul. 24, 1989, U.S. Pat. No. 5,032,623.

BACKGROUND OF THE INVENTION

1. Field of the Invention

The present invention relates to rigid foams, and more particularly to the preparation of such foams utilizing fluorocarbon blowing agents.

2. Description of the Prior Art

Rigid foams conventionally have been prepared by a two-component or three-component process. One component, generally referred to as component A, comprises isocyanate. The second component, known generally as component B, comprises any of various polyols, particularly polyester or polyether polyols. Component B may also comprise a surfactant, a catalyst package and a blowing agent, any of which may be introduced to the reaction mixture as a third stream. If an excess of isocyanate is employed, foams may be formed that are modified polyisocyanate foams. The foams produced by these standard methods commonly have a density in the range of of from about 1 lb.ft.$^3$ to about 4 lb./ft.$^3$, have a closed cell content on the order of about 94% and have low friability characteristics.

Ordinarily, the polyol is mono- or di-functional. That is, the polyol molecule has one or two branches which provide linking sites for cross-polymerization. Typically, the blowing agent is Freon-11 or Freon-12 (trade designations of E. I. du Pont de Nemours & Co.) or a mixture thereof, often in combination with water.

Recently, however, such processes for preparation of rigid polyurethane foam have been the subject of environmental concern in view of the deleterious effects Freon-11 and Freon-12 have been reported to have on the earth's ozone layer. As a result, the availability of Freon-11 and Freon-12 for such use is seriously threatened and the total phasing out of the use of Freon-11 and Freon-12 in the manufacture of rigid foam is desirable. Freon-22 (a trade designation of E. I. du Pont de Nemours & Co. for monochlorodifluoromethane or CHClF$_2$) has been considered as a blowing agent in rigid foams (see, for example, U.S. Pat. No. 4,205,136 and 4,636,529), usually in combination with other freon blowing agents. However, Freon-22 generally has been considered and found to have a vapor pressure so high that the use of significant quantities of it as a blowing agent in standard formulations results in a closed cell content too low to be acceptable for typical rigid foam applications.

Other problems have also been encountered with rigid foams based on, for example, Freon-11. In particular, foam based on Freon-11 and having a density in the range of 1.8 to 2.5 lb./ft.$^3$ and prepared without use of aromatic polyethers tend to shrink at low temperatures. In fact, at temperatures of, say, $-75°$ F. or lower, conventional Freon-11 foam has been found to have poor dimensional properties.

Accordingly, methods for preparation of rigid polyurethane foam are needed that do not utilize Freon-11 or Freon-12, but which are economically competitve with foams made with Freon-11 or Freon-12 and produce a foam that has a density equivalent to that of conventional foams, a closed cell content at least as high as that of conventional foams and low friability characteristics. It it also desirable that the foam resist shrinkage at low temperatures.

SUMMARY OF THE INVENTION

Briefly, therefore, the present invention is directed to a novel method for preparation of rigid foam. The method comprises mixing at least two components to form a reaction mixture. The mixture comprises isocyanate, up to 20% Freon-22, up to to about 2% by weight of water, and a combination of polyols having an average OH number of from about 300 to about 500 and comprising polyalkoxylated glycerin having an OH number of from about 200 to about 300 and in which the alkoxy groups each have from two to about three carbon atoms.

The present invention is also directed to a novel method for preparation of rigid foam. The method comprises mixing a component A with a component B. Component A comprises isocyanate, from about 0.5% by weight to about 12% by weight Freon-22 based on total component A, and a surfactant. Component B comprises from about 65% by weight to about 95% by weight, based on total component B, of a combination of polyols, from about 0.5% by weight to about 3% by weight of water, based on total component B, up to about 5% by weight of amine catalyst, based on total component B, and from about 1% by weight to about 25% by weight of Freon-22, based on total component B. The combination of polyols comprises a first polyol constituent, which comprises a polyalkoxylated amine having an average OH number of from about 500 to about 700 and in which the alkoxy groups each have from two to three carbon atoms, a second polyol constituent, which comprises a sucrose-based polyol having an average OH number of from about 300 to about 400 and an average functionality of at least about 3, and a third polyol constituent, which comprises polyalkoxylated glycerin having an average OH number of from about 200 to about 300 and in which the alkoxy groups each have from two to three carbon atoms.

The present invention is also directed to a novel blend suitable for use as a component in a two-component method for preparation of rigid foam. The blend comprises isocyanate, from about 0.5% by weight to about 12% by weight Freon-22 based on the total weight of the blend, and a surfactant.

The present invention is further directed to a novel blend suitable for use as a component in a two-component method for preparation of rigid foam. The blend comprises from about 65% by weight to about 95% by weight, based on total blend, of a polyol mixture, from about 0.5% by weight to about 3% by weight of water, based on total blend, up to about 5% by weight of amine catalyst, based on total blend, and from about 1% by weight to about 25% by weight of Freon-22, based on total blend. The combination of polyols comprises several polyol constituents. A first polyol constituent, which comprises a polyalkoxylated amine having an average OH number of from about 500 to about 700 and in which the alkoxy groups each have from two to three carbon atoms. A second polyol constituent, which comprises a sucrose-based polyol having an average OH number of from about 300 to about 400 and an average functionality of at least about 3. A third polyol constituent which comprises polyalkoxylated glycerin having an average OH number of from about 200 to about 300 and in which the alkoxy groups each have from two to three carbon atoms.

The present invention is also directed to a novel rigid foam produced by mixing a component A as described above with a component B as described above.

The present invention is further directed to a novel rigid foam produced by mixing at least two components to form a reaction mixture. The mixture comprises isocyanate, from about 2% by weight to about 10% by weight Freon-22, from about 0.25% by weight to about 2% by weight of water, and a combination of polyols having an average OH number of from about 300 to about 500 and comprising polyalkoxylated glycerin having an average OH number of from about 200 to about 300 and in which the alkoxy groups each have from two to about three carbon atoms.

The present invention is also directed to a novel rigid foam comprising cells of gaseous $CHClF_2$, having a closed cell content of at least 85% and exhibiting less than 5% volume change when cooled from room temperature to $-200°$ F.

Among the several advantages found to be achieved by the present invention, therefore, may be noted the provision of a method for preparation of rigid foam in which Freon-11 or Freon-12 is not needed; the provision of such method that is economically competitve with foams made with Freon-11 or Freon-12; the provision of such method that produces a foam that has a density equivalent or lower than that of conventional foams; the provision of such method that produces a foam having a closed cell content at least as high as that of conventional foams; the provision of such method that produces a foam having lo friability characteristics; the provision of such method that produces a foam that resists shrinkage at low temperatures; the provision of blends useful in such method; the provision of a rigid foam produced by such method; and the provision of rigid polyurethane foams having the characteristics of foams produced by such method.

DESCRIPTION OF THE PREFERRED EMBODIMENTS

In accordance with the present invention, it has been discovered that by using Freon-22 as a blowing agent and including a polyalkoxylated glycerin having an average OH number of from about 200 to about 300, and in which the alkoxy groups each have from two to three carbon atoms, as a polyol in the preparation of a rigid foam, a rigid foam of superior qualities may be produced without the use of Freon-11 or Freon-12. This method may be used to produce all types of rigid foams derived from isocyanate, including rigid polyurethane, polyisocyanurate, and modified polyisocyanate foams.

Although the cost of Freon-22 historically had been significantly higher than the costs of Freon-11 and Freon-12, recent increases in the cost of Freon-11 and Freon-12 resulting from attempts to decrease usage of such environmentally disfavored fluorocarbons have made Freon-22 not only economically competitive, but less expensive than Freon-11 and Freon-22. Nevertheless, Freon-22 still has not been adopted for use by the rigid foam industry because of the concerns of storage and the low closed cell content generally associated with Freon-22 and its high vapor pressure.

Accordingly, the rigid foam industry has not yet abandoned the use of Freon-11 and Freon-12. However, it now has been discovered that by including an elastomer commonly used in items such as bowling balls but not commonly recognized as a polyol for use in preparation of rigid foams, that is, a polyalkoxylated gycerin polyol, in component B, surprisingly, rigid foams of appropriate density and very high closed cell content, in fact, closed cell contents even somewhat higher than that of commercial foams prepared by techniques utilizing Freon-11 or Freon-12, can be produced.

Moreover, it has been found that by including Freon-22 in component A as well as component B, lower pressures may be employed for storage of the components than would be required for storage of undissolved Freon-22, and the components can be blended more easily and thoroughly than they can without the dissolved Freon-22. Not only that, but the foams produced by the method of this invention have low friability characteristics, an insulation value similar to foams produced in the conventional manner and, perhaps even more surprisingly, have been found to have no detectable volume change, i.e., less than 5% volume change, generally less than 1% shrinkage, at temperatures below $-200°$ F.

The two-component method of this invention comprises mixing together a component A and a component B. Component A comprises isocyanate, a surfactant and Freon-22. The isocyanate may be any of the isocyanates conventionally use in the production of rigid foams. Thus, any of the polyfunctional isocyanates, such as diphenylmethane-4,4'-diisocyanate, xylylene diisocyanates, polymethylenepolyphenylisocyanates 3,3'-diphenyldimethylmethane-4,4'-diisocyanate, 2,4-tolylenediisocyanate dimer, m-phenylenediisocyanate, tolylene diisocyanates or mixtures thereof, may be used.

The surfactant aids in retaining the Freon-22 in solution. Silicones, such as V8407 sold by Goldschmidt Chemical Corp., non-reactive polymers and tris(2-chloropropyl) phosphates have been found to be particularly suitable.

If desired, other compositions may also be included in the component A to inhibit acid formation. Alpha-methylstyrene is a particularly effective acid formation inhibitor.

The materials of component A may be blended in any standard manner, except that introduction of the Freon-22 should be under pressure, such as from about 50 p.s.i.a. to about 200 p.s.i.a. In order to minimize the duration of high pressure application, the Freon-22 should be the final ingredient blended into the mixture to form component A. Other than that consideration, the order of blending is not particularly significant. Nevertheless, a convenient order of mixing is to add surfactant to isocyanate in a stirred vat, and then to add the acid inhibitor, if any. Finally, the Freon-22 is added under pressure as noted above.

The relative proportions of ingredients should be such that the concentration of Freon-22 in component A is from about 0.5% by weight to about 12% by weight, preferably about 1% by weight to about 7% by weight. Inclusion of the Freon-22 in component A has been found to lower the viscosity of component A, thereby permitting a more thorough mixing with component B. In addition, the employment of Freon-22 in component A has been found to result in a final rigid foam product of lower density, such that foams having a density of about 1 to about 1.4 lb./ft.$^3$ as opposed to a density of about 2 lb./ft.$^3$ may be produced.

The surfactant makes up less than about 1% by weight, preferably about 0.75% by weight, of component A. If an acid inhibitor is desired, it may be included in a concentration of up to about 0.5% by weight, based on the weight of Freon-22 in component A. That is, up to about 5 parts by weight of the acid formation inhibitor is add to component A per 1000 parts by weight of Freon-22 in component A. The balance of component A comprises the isocyanate.

Alternatively, component A may contain solely isocyanate and the Freon-22 may be injected into the reaction mixture as a separate stream or the Freon-22 may reside solely in the component B. In such cases, a surfactant need not be included in component A. However, although this technique has been found to be useful to some extent for spray foams, generally it has been found that if the Freon-22 is not added to component A, component A and component B do not mix as thoroughly under standard mixing conditions as desired. This is especially true for froth foams. Therefore, it is highly preferred to include Freon-22 and a surfactant in component A.

Component A should be stored under pressure great enough to retain the Freon-22 in the mixture of component A. Because the pressure required to retain the Freon-22 in the mixture of component A is less than the vapor pressure of Freon-22, lower pressure than that required for storage of Freon-22 alone, or for mixing of Freon-22 into the mixture for preparation of component A, is needed. In addition, maintaining component A at lower temperatures allows the use of lower pressure. Thus, it is preferred that component A be maintained at about 60° F. or less.

Component B comprises from about 65% by weight to about 95% by weight, preferably about 86% by weight to about 92% by weight, based on total component B, of a combination of polyols. The combination of polyols comprises at least three polyol constituents. The first polyol constituent comprises a polyalkoxylated amine having an average hydroxyl number (i.e., an average OH number) of from about 500 to about 700, preferably from about 550 to about 650, most preferably about 580 to about 620, and in which the alkoxy groups each have from two to three carbon atoms. Thus, propoxylated or ethoxylated or propoxylated and ethoxylated mono-, di- or triethanolamines are particularly desirable; however, any of the standard polyether amines known in the art for use in preparation of rigid foams are believed to be suitable. It is preferred that the polyalkoxylated amine be a monoamine to avoid an overly viscous composition and that it have three alkoxylated branches for maximum functionality. Nevertheless, even this trifunctionality is not sufficient and the amine is too autocatalytic to utilize the polyalkoxylated amine as the sole polyol.

Accordingly, while use of the first polyol constituent imparts to component B a viscosity low enough for sufficient mixing with component A by standard techniques, the second polyol substituent is included to increase functionality. The second polyol constituent comprises a polyoxyalkylated sucrose-based polyol having an average OH number of from about 300 to about 400, preferably about 350 to about 380, and an average functionality of at least about 3, preferably from about 3 to about 8, usually about 3 to about 5. Any of the conventional polyols for this purpose may be employed. The sucrose-based polyol may be ethoxylated or propoxylated or both. Generally, this constituent has a viscosity as high as 4,000 c.p.s., possibly as high as 8,000 c.p.s.

Preferably, the second constituent further comprises ethylene glycol-based polyols or glycerin-based polyols. If desired, the polyols of the second constituent may be prepared by polyoxyalkylating from a mixture of sucrose and either ethylene glycol or glycerin, or both with ethylene oxide, propylene oxide or both. Such polyols are known in the art and currently are used in component B in standard rigid foam preparation techniques. Especially suitable polyols are Vornal-360 as sold by Dow Chemical Co. and Poly-G 74-376 as sold by Olin Corp.

The third polyol constituent comprises polyalkoxylated glycerin having an average OH number of from about 200 to about 300, preferably about 260 to about 300, and in which the alkoxy groups each have from two to three carbon atoms. The viscosity of such polyethers, which may be propoxylated or ethoxylated or propoxylated and ethoxylated glycerin, have a viscosity of less than about 600 c.p.s., and most desirably less than 200 c.p.s. These polyethers are known generally for their use as elastomers in articles such as bowling balls, and are not ordinarily considered for use in preparation of rigid foams. A particularly effective polyalkoxylated glycerin is sold by Olin Corp. under the trade designation Poly-G 30-280.

However, it has now been found that such polyethers not only aid in the reduction of the high viscosity imparted to the component B mixture by the second polyol constituent, but also, because the glycerin-based polyol is not autocatalytic, the reaction profile may be controlled, and perhaps due in part to their trifunctionality, provide molecules that seem to retain or help retain the Freon-22 in the foam being formed, thereby resulting in a Freon-22-containing foam of extremely high closed cell content. In fact Freon-22 seems to be held in this foam to an even greater extent than is Freon-12 in commercial foams, resulting in an even higher closed cell content than achieved with conventional foams.

The following weight proportions of the constituents of the combination of polyols have been found to be desirable. The first constituent should constitute from about 4% to about 15%, preferably about 6%, of the combination of polyols. The second constituent should constitute from about 35% to about 65%, preferably about 55%, of the combination of polyols. The third constituent should constitute the remainder of the combination of polyols—from about 25% to about 45%, preferably about 40%, especially about 39%, of the combination of polyols.

It should be understood that the polyols in the combination need not form a separate composition package to be added as a single ingredient to form component B. Thus, it is not necessary to mix the three constituents of the mixture together to form a premix and then to form component B by admixing the premix with the remaining ingredients of component B, although that is an option. The ingredients of component B may be mixed in any order, and the three constituents of the combination of polyols may be added separately from each other as separate ingredients to form component B.

In addition to the polyols, component B further comprises from about 0.5% by weight to about 3% by weight, preferably from about 1% by weight to about 2% by weight, most preferably about 1.5% by weight water. The water is understood to serve not only as a blowing agent but to add rigidity to the resulting foam.

Component B further comprises Freon-22 and a water/isocyanate reaction catalyst. Preferably, the catalyst is an amine catalyst, especially a tertiary amine catalyst, and serves to promote the reaction between water of component B and the isocyanate of component A when the two components are blended. Freon-22 makes up about 1% by weight to about 25% by weight, preferably about 3% by weight to about 10% by weight, of component B. Generally, component B should comprise less than about 5% by weight, preferably about 1% by weight to about 2% by weight, of the water/isocyanate reaction catalyst.

As with component A, component B may, alternatively, contain no Freon-22 or only a small amount of Freon-22, and the Freon-22 may be injected into the reaction mixture as a separate stream. However, it has been found that if the Freon-22 is not added to component B, component A and component B do not mix as thoroughly under standard mixing conditions as desired. Therefore, it is highly preferred to include Freon-22 in component B. If component A is free of Freon-22, the Freon-22 concentration of component B should be increased, or enough Freon-22 should be introduced by means of a third stream so that the concentration of Freon-22 in the reaction mixture is in the range of from about 1% by weight to about 12% by weight, preferably from about 4% by weight to about 8% by weight, based on the total reaction mixture.

For spray foams, one or both of two additional catalysts may be included in component B. Up to about 1% by weight of component B of a system for preparation of a spray foam may be an organometallic catalyst, such as a lead or tin, but especially lead, based catalyst. Typical lead based catalysts have a lead content in the range of about 24% to about 36% lead, based on weight. Thus, the total lead content of component B due to the lead based catalyst should be less than about 0.5% by weight.

The second additional catalyst in component B of a spray foam system is a trimerization catalyst. The catalyst is generally amine based or metal based, such as potassium octoate. This catalyst may be included in a concentration of less than about 1.5% by weight, for example, about 0.3% by weight, of component B of spray foam systems.

The ingredients of component B may be admixed in any order, provided, however, that if an organometallic catalyst is employed, it should not be added to the mixture simultaneously with the water. In order to prevent reaction between the organometallic catalyst and water, the addition of those two ingredients should be separated by thoroughly blending of the firstly added of those two ingredients into the mixture. Further, for the reasons discussed with respect to component A, it is desirable to add the Freon-22 as the final ingredient of component B. As with component A, Freon-22 should be added under pressure, and component B should be stored at a pressure high enough to hold the Freon-22 in the mixture of component B.

Component A and component B may be mixed, such as through a static mix chamber, by standard procedures to produce a homogenous blend. As with the conventional foams, the blend is allowed to age and to expand to form rigid foam. The method of this invention may be used to produce spray foams and low density and standard density as well as high density foams. Component A and component B are mixed in a relative proportion such that the ratio of the cyano groups of component A to the hydroxyl groups of component B, that is, the NCO/OH ratio or index, is generally from about 1:1 to about 3:1. With respect to polyurethane foams, the weight ratio of Component A to Component B is generally within the range from about 120:100 to about 100:110, preferably to about 100:100–110:100. Polyisocyanurate foams may be produced when the NCO/OH ratio is in the range of from about 2:1 to about 3:1, such as about 2.5:1. Moreover, with respect to formation of polyisocyanurate foams, the temperature of the mold or fixture into which the mixture is injected should be maintained at at least 120° F. Other rigid urethane foams are produced by a process employing an NCO/OH ratio of from about 1:1 to about 2:1.

As with the prior art systems, the selection of the catalyst, blowing agent concentration and the NCO/OH ratio determines whether the foam is a spray foam, a low density foam, a standard density foam or a high density foam. To produce a spray foam, a high concentration of water/isocyanate reaction catalyst, an organometallic catalyst and, optionally, a trimerization catalyst are employed and the components are blended in an NCO/OH ratio of from about 1:1 to about 1.8:1. For the other foams, a water/isocyanate reaction catalyst concentration in component B of from about 1% by weight to about 3% by weight is employed. The NCO/OH ratio for low density and standard density foams is from about 1:1 to about 1.15:1.

Surprisingly, the rigid foam produced by the method of this invention not only has an acceptable closed cell content despite the use of Freon-22 (at least 85%), but has been found to have a closed cell content equal to or even better than commercially available foams made with Freon-11 and Freon-12. Thus, whereas the standard foams have been found to have a closed cell content typically about 94%, the rigid foam of this invention has a closed cell content not only in excess of about 85%, but typically at least about 95%. Moreover, the Freon-22-containing foam of this invention has been determined to have low friability characteristics and a temperature insulative quality on the order of the Freon-11 and Freon-12 foams.

The following examples describe preferred embodiments of the invention. Other embodiments within the scope of the claims herein will be apparent to one skilled in the art from consideration of the specification or practice of the invention as disclosed herein. It is intended that the specification, together with the examples, be considered exemplary only, with the scope and spirit of the invention being indicated by the claims which follow the examples. In the examples all percentages are given on a weight basis unless otherwise indicated.

EXAMPLE 1

A nominally 2 lb./ft$^3$ spray foam was prepared as follows. The following compositions were admixed in the order and proportions set forth below to form a component B.

| | |
|---|---|
| Poly G 70–600* | 10.3% |
| Poly G 30–280* | 33% |
| Poly G 74–376* | 47% |
| B8408** | 1% |
| Polycat 8*** | 2% |
| Water | 2.5% |
| 36% Lead Catalyst | 0.5% |
| K-70**** | 0.3% |

-continued

| | | |
|---|---|---|
| Freon-22 | 3% | |
| Alpha-Methylstyrene | 0.015% | |

*Polyols of Olin Corporation. 70–600 is an amine based triol of OH No. 600, 30–280 is a glycerin based triol of OH No. 380, all of which are secondary hydroxyls, 74–376 is a sucrose EG polyol of OH No. 376.
**A surfactant sold by Goldschmidt Chemical Corp.
***A potassium catalyst sold by Cosan Chemical Corp.
****An amine catalyst of Air Products and Chemicals, Inc.

The water was thoroughly blended into the mixture before addition of the lead and potassium catalysts.

Component A comprising solely isocyanate was mixed with the component B in an A/B weight ration of 100/85 and reacted as follows. Components A and B were added to separate pressure vessels under a pressure of 250 psi and a temperature in excess of 90° F. The chemicals were then pressure fed from the vessels through hoses maintained at 125°–135° F. to a solventless spray gun such as the Gusmer Model D gun.

A sample of foam was produced by building up ¼ inch to ¾ inch layers. Each layer was applied once the previous layer became "tack free" and layers were applied until final thicknesses of 6–12 inches were made and allowed to cure for 24 hours. Test samples were then cut from the samples and the following tests were performed with the following results:

| Property | Test Method | Value |
|---|---|---|
| Core Density | ASTM D-1622 | 2.0 + 0.2 lb./ft.$^3$ |
| Closed Cell Content | ASTM D-1940 | 96% |
| Compressive Strength | | |
| (Parallel) | ASTM D-1621 | 35 psi |
| (Perpendicular) | ASTM D-1621 | 26 psi |
| Flexural Strength | ASTM D-790 | 59.2 psi |
| H$_2$O Absorption | ASTM D-2127 | 0.09 lb./ft.$^2$ |
| Humid Aging | ASTM D-2126 | +2.6% |

EXAMPLE 2

A foam was prepared as follows. Component A was prepared by mixing five parts by weight of Freon-22 per 100 parts isocyanate and 0.75 parts by weight of a nonreactive silicone surfactant. Component B was prepared by mixing the following compositions in the proportions and in the order identified in the table below. Compositions are identified in Examine 1 above.

| | | |
|---|---|---|
| Poly G 70–600 | 5% | |
| Poly G 30–280 | 33% | |
| Poly G 74–376 | 47% | |
| B8408 | 1% | |
| Polycat 8 | 1% | |
| Water | 2% | |
| Freon-22 | 11% | |
| Alpha Methylstyrene | 0.05% | |

The procedure outlined in Example 1 was followed to mix components A and B, except that the components were pressurized through a frothing gun which utilizes a static mixer. This method produces 1.4 lb./ft.$^3$ foam. However, samples of the foam were shot from the gun into a 3½ inch×8 ft.×2 ft. mold to a 1.8 lb./ft.$^3$ in-place density. Samples were cut from the center of the mold and the following tests were performed with the following results.

| Property | Test Method | Value |
|---|---|---|
| Dimensional Stability | ASTM D-2126 | +2.11% |
| 7 days 158° F. 100% Humidity | | |
| 7 days −20° F. No Change | | |
| Shear Strength | ASTM C-273 | 18 psi |
| Flexural Strength | ASTM D-790 | 40 psi |
| Compressive Strength | | |
| Perpendicular to Rise | ASTM D-1621 | 12 psi |
| Parallel to Rise | ASTM D-1621 | 13 psi |
| Water Absorption | ASTM 2127 | 0.09 lb./ft.$^2$ |
| K-factor Aged | ASTM C-177 | 0.15 |
| Closed Cell Content | ASTM D-1940 | 96% |

In view of the above, it will be seen that the several advantages of the invention are achieved and other advantageous results attained.

As various changes could be made in the above methods and compositions without departing from the scope of the invention, it is intended that all matter contained in the above description shall be interpreted as illustrative and not in a limiting sense.

What is claimed is:

1. A blend suitable for use as a component in a two-component method for preparation of rigid foam, the blend comprising
   (a) from about 65% by weight to about 95% by weight, based on the total weight of the blend, of a combination of polyols comprising a first polyol constituent, which comprises a polyalkoxylated amine having an average OH number of from about 500 to about 700 and in which the alkoxy groups each have from two to three carbon atoms, a second polyol constituent, which comprises a sucrose-based polyol having an average OH number of from about 300 to about 400 and an average functionality of at least about 3, and a third polyol constituent, which comprises polyalkoxylated glycerin having an average OH number of from about 200 to about 300 and in which the alkoxy groups each have from two to three carbon atoms;
   (b) from about 0.5% by weight to about 3% by weight of water, based on total blend;
   (c) up to about 5% by weight of water/isocyanate reaction catalyst, based on total blend; and
   (d) from about 1% by weight to about 15% by weight of CHClF$_2$, based on total blend.

2. A blend as set forth in claim 1 wherein said polyalkoxylated amine is a polyalkoxylated monoamine and the second constituent of the combination of polyols further comprises an additional polyol selected from the group consisting of ethylene glycol based polyols and glycerin based polyols.

3. A blend as set forth in claim 1 wherein said polyalkoxylated amine is a polyalkoxylated monoamine and the combination of polyols comprises from about 4% by weight to about 15% by weight of said first constituent, from about 35% by weight to about 65% by weight of said second constituent, and from about 25% by weight to about 45% by weight of said third constituent.

4. A blend as set forth in claim 1 wherein said polyalkoxylated amine is a polyalkoxylated monoamine and further comprising up to about 1% by weight, based on total blend, of an organometallic catalyst and up to about 1.5% by weight, based on total blend, of a trimerization catalyst.

* * * * *